3,112,480
COLLISION DIRECTION DETERMINING AND
INDICATION SYSTEM
Emory Lakatos, Los Angeles, Calif., assignor to Thompson Ramo Wooldridge Inc., Los Angeles, Calif., a corporation of Ohio
Original application May 28, 1956, Ser. No. 587,768, now Patent No. 2,991,463, dated July 4, 1961. Divided and this application Feb. 26, 1959, Ser. No. 795,730
11 Claims. (Cl. 343—9)

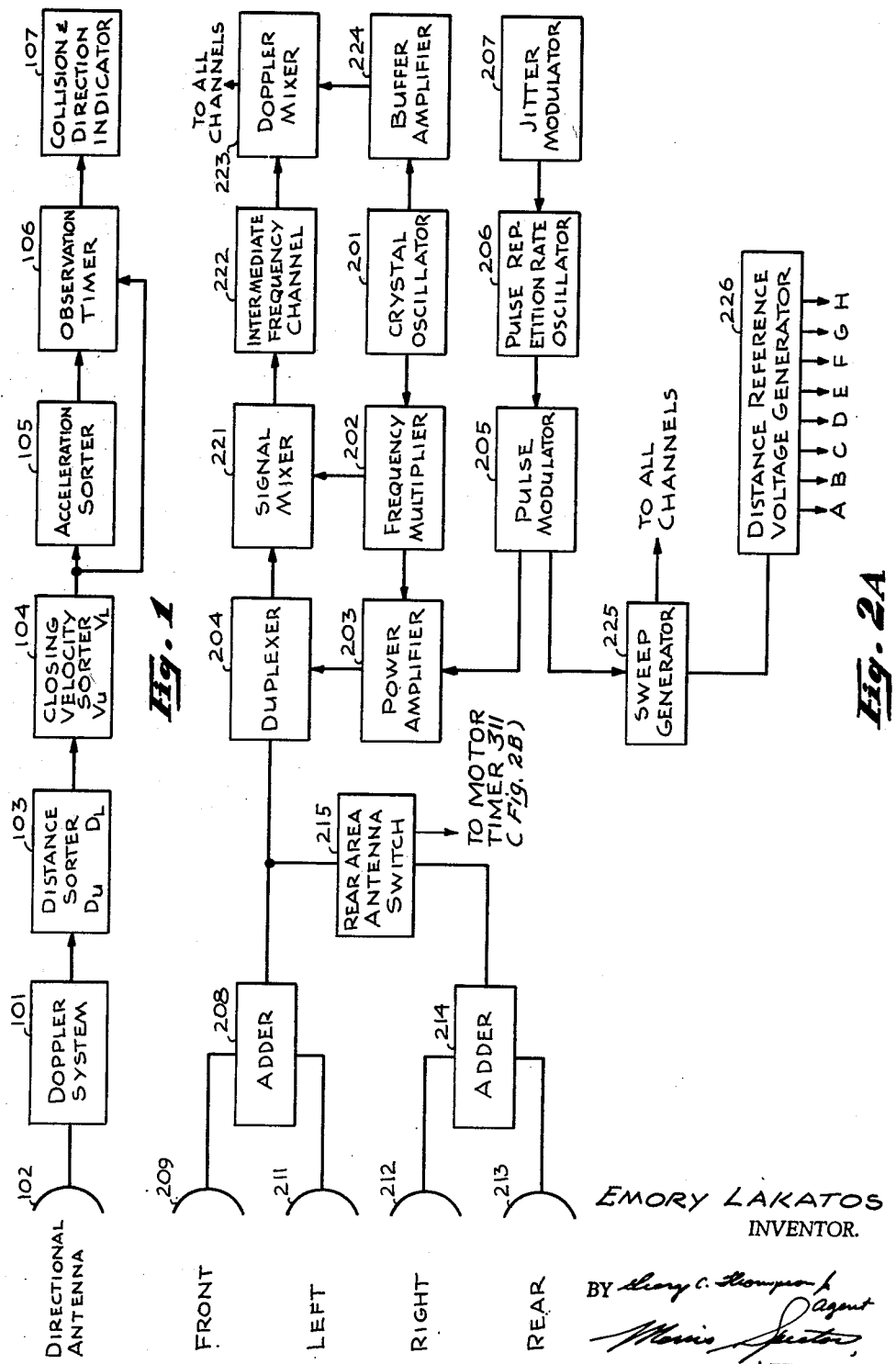

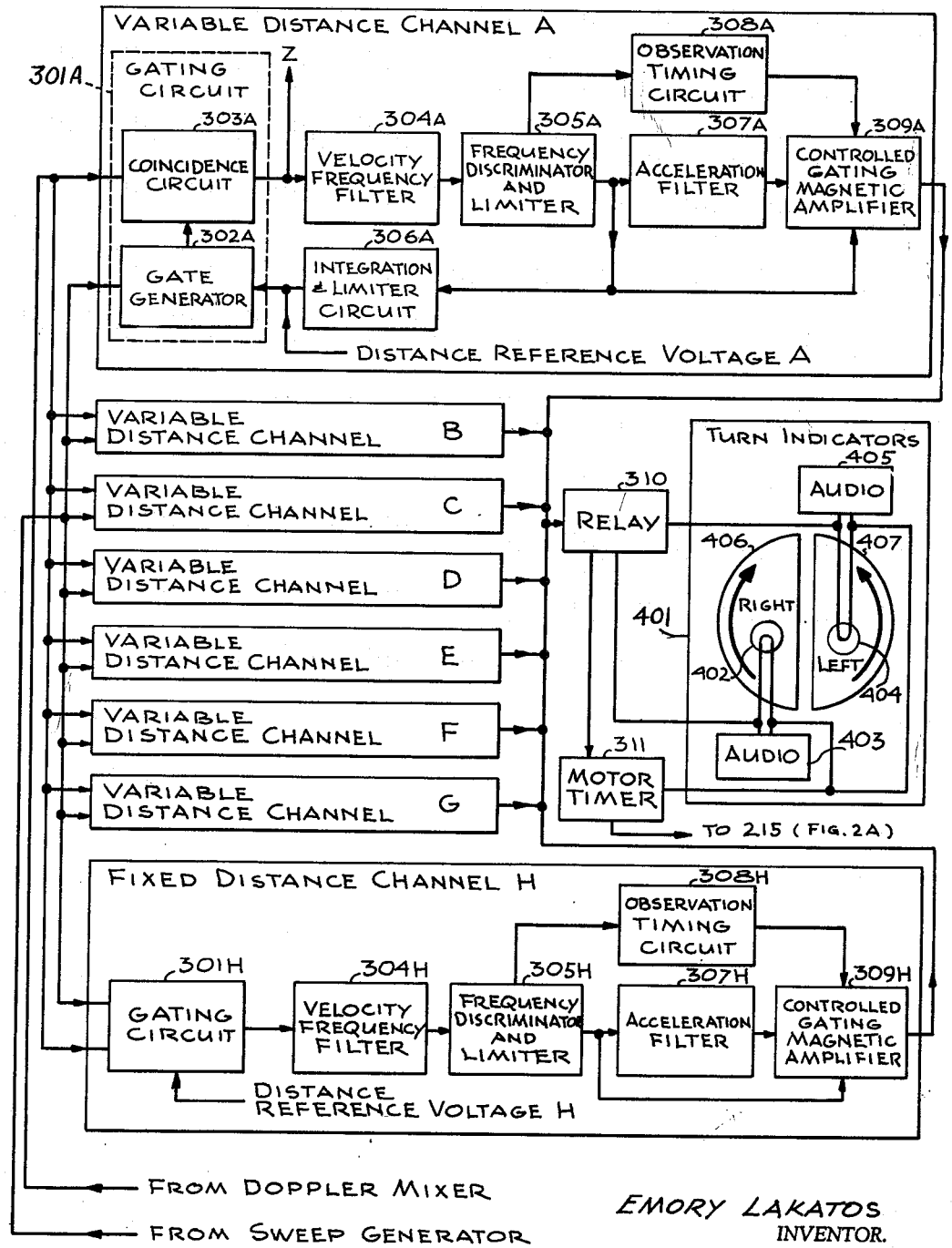

This invention relates to a collision direction indication system, and more particularly to such a system utilizing a plurality of controllable directional antennas. The present system is a division of and is disclosed in the copending U.S. patent application, Serial No. 587,768, filed May 28, 1956, now Patent Number 2,991,463, issued July 4, 1961, entitled "Collision Indication Systems," by Emory Lakatos et al., and assigned to the common assignee.

As air traffic continues to increase, the problem of collision avoidance becomes ever more acute. Daily, there are reports of collisions and near misses between aircraft as landing fields and air lanes become more and more congested. With the advent of jet airliners, the already dangerous situation has become worse, since the speeds of these aircraft are such that a pilot must detect a collision course of a more distant object requiring evasive action.

Despite the increase in air traffic hazards and the concern that has been expressed about the collision avoidance problem, up to this time few practical systems have been devised which are capable of even approximating the requirements of an ideal collision indication system. Such an ideal system would provide complete world-wide protection against all terrain and aircraft obstacles and would possess the ability to distinguish between collision and non-collision courses in sufficient time to enable the aircraft bearing the equipment to avoid oncoming obstacles. Also, the system would be able to process information relating to more than one relatively moving object, two or more of which may constitute contemporaneous collision threats, would provide an automatic indication of the proper evasive action, and would be reliable in operation, simple in design, easy to maintain, and completely independent of equipment, other than that borne by the aircraft to be protected. In addition to determining a collision threat, it is desired to detect the direction of approach and thus select the best evasive action. For the great majority of cases encountered by aircraft, the system disclosed herein will meet, or can be adapted to meet, all of the foregoing requirements.

One object of the present invention is, therefore, to provide automatically information as to the direction of approach of a collision threat and indicate a proper evasive action that may be taken to avoid an oncoming object on the collision course.

Another object of the invention is to provide a direction determining arrangement for a collision indication system that will be reliable in operation, simple in construction, and easy to maintain.

Other objects and advantages will appear as the description of the invention proceeds.

Briefly stated, one embodiment of the present invention is adapted to cooperate with a collision indication system which sorts signals having characteristics proportional to or which are a function of the distances and the closing velocities between the system and objects moving relative thereto, closing velocity being defined as the relative velocity measured along a straight line between the system and an object. The sorting is governed by the principles that warning indications are necessary only in cases of imminent collision or dangerously close passage and that when there is substantially no change in closing velocity between an object and the collision warning system, it means that a collision or a near collision course exists.

In the direction indicating process, the present invention provides a plurality of signal sensing devices each receptive of signals from distinctly different directions. When an incoming signal is sensed by one of these devices and processed to a point capable of providing an annunciation of a collision threat, a portion of the sensing devices are selectively desensitized. If the collision threat signal is unaffected by the desensitizing of the portion of sensing devices, it may be assumed that it is being received by one of the remaining devices and an annunciation of a proper evasive maneuver is provided. If the signal is eliminated by the desensitizing of the portion of sensing devices, warning annunciation is made indicating a different evasive maneuver. The electric circuit components for controlling the desensitizing of the devices and the providing of a warning annunciation are selected to cause such rapid switching between sensing devices that an incorrect indication will not be perceived by a pilot.

The features of this invention which are believed to be novel and patentable are pointed out in the claims which form a part of this specification. For a better understanding of the invention, reference is made in the following description to the accompanying drawings, wherein like parts are indicated by like reference numerals, in which:

FIG. 1 shows, in block diagram form, the basic elements of the collision warning system usable with and including the invention; and FIGS. 2A and 2B depict, in block diagram form, a preferred embodiment of the invention.

The present invention, although not limited thereto, is adapted to cooperate with the invention disclosed in the before-mentioned United States Patent Number 2,991,463 which takes advantage of the fact that in a collision warning system, warnings from objects extremely remote from the system could very easily be false alarms since the objects might turn aside a considerable time before they could arrive at the system.

In a preferred embodiment of the present invention, advantage is taken of the fact that, in general, the evasive maneuver to avoid a collision situation is that which will avoid an object moving toward the system along an essentially straight line course with the least change of course of the system. To this end, the present invention, in one of its preferred embodiments, provides an effective detection of the direction of the threatening object.

Apparatus 101 is shown in FIG. 1 and labeled Doppler System. Such a system operates upon the principle of the doppler effect, which states that the frequency of energy reflected directly back to an energy source from a relatively moving object will be changed by an amount proportional to the relative velocity between the source and that object. Moreover, the signals derived by the system also indicate the straight line distances between the energy source and the object moving relative thereto. Although such a system could be a radar system utilizing electrical energy to derive echo signals, the present invention is not limited thereto, since other forms of energy, such as light or sound could be used in accordance with the principles of the invention.

In order to direct the energy from the doppler system in a particular direction and receive the echo signals, a device 120 labeled Directional Antenna is provided. Elements 101 and 102 together make it possible to transmit radiant energy in a particular direction and derive echo signals from objects moving relative there to with characteristics which are a function of or proportional to the distances and closing velocities of these objects relative thereto.

A device 103, labeled Distance Sorter, is shown connected to the doppler system 101, and this device serves to sort the echo signals in accordance with the distances of the objects with which they are associated. In at least this sense the signals selected have a characteristic proportional to distance, and the device 103 provides signal information representing distance of the object. As indicated, it only allows signals to pass through from objects at distances lying between a range of distances, the far extremity of this range being defined by a maximum or upper distance, $D_U$, while the near extremity of the range is defined by a minimum or lower distance, $D_L$, the values of all distances being measured outwardly from the system. Connected to the output of the distance sorter is a device 104, labeled Closing Velocity Sorter, which only permits motion indicating signal information to pass through if their characteristics indicate that they were derived from objects having closing velocities lying between a range of closing velocities defined by an upper or maximum value of closing velocity $V_U$, to a lower or minimum value of closing velocity $V_L$. To the output of sorter 104 is connected a device 105, labeled Acceleration Sorter, for only passing signals whose characteristics indicate that their associated objects exhibit substantially no change in closing velocity.

The outputs from the velocity sorter 104 and acceleration sorter 105 are both coupled to a device 106 for determining the amount of time that signals entering directional antenna 102 are allowed to pass through the system; device 106 is labeled Observation Timer. This timer will only pass signals therethrough after the outputs from both acceleration sorter 105 and closing velocity sorter 104 are applied to it for a given interval of time. When this condition exists, the output of observation timer 106 is fed into an indicator device 107, which is labeled Collision and Direction Indicator.

From the foregoing description, it will be apparent that the system shown in FIG. 1 will send out signals in a particular direction and will receive echo signals having characteristics indicative of the distances and closing velocities of the objects from which they were reflected. It will also be clear that only if these objects lie within a given range of distances and closing velocities, and if they also have a substantially constant closing velocity and remain within these ranges for the given time interval, will their associated signals ultimately pass through the observation timer and activate the collision and direction indicator.

Now, let it be assumed that a desired minimum warning time, $t_d$, is needed after signals pass through the system in order that a craft carrying the collision warning system may have sufficient time to turn away from the associated objects on a collision course therewith. This desired minimum warning time would have two components, a maneuver time, $t_m$, for actually turning the craft, and a reaction time, $t_r$, to enable the pilot of the craft to see the collision warning and start to turn his craft. Let it further be assumed that the given time interval introduced by observation timer 106 is an observation time of $t_o$. From the foregoing, it will be apparent that $$t_d = t_m + t_r \quad (1)$$

Now, assuming that there is a given upper closing velocity $V_U$ that is the maximum closing velocity reasonably to be expected, we calculate the upper or maximum distance extremity $D_U$ of the distance range as follows:

$$D_U = V_U(t_d + t_o) \quad (2)$$

We then determine the lower distance extremity $D_L$ of the distance range by observing that an object traveling at velocity $V_U$ must be observed for a time at least equal to the observation time $t_o$. Hence $D_L = D_U - V_U t_o$ (3a). Knowing the value of $D_U$ from Equation 2 and substituting same in Equation 3a, the value of $D_L$ then becomes the following equation:

$$D_L = V_U t_d \quad (3b)$$

By so fixing the upper and lower values of distance, we ensure that an object at the maximum distance $D_U$ and having a closing velocity of $V_U$ will be observed for a time $t_o$ in our collision warning system, and that our system will give a warning time of $t_d$ for all such objects. Next, we chose a value $V_L$ for the lower closing velocity as determined by the following equation:

$$V_L = KV_U \quad (4)$$

where K is a constant having a value less than one.

From the foregoing, it will be apparent that the ranges of closing velocities and distances have been so chosen that any object falling within these ranges for a time $t_o$ can only arrive at the system within a given time interval. This arrival time interval has a maximum value, $t_{max}$, when an object is at a distance $D_U$ and has a closing velocity of $V_L$. We thus find that:

$$t_{max} = D_U/V_L \quad (5)$$

and from Equations 2 and 4 we find:

$$t_{max} = V_U(t_d + t_o)/V_L = (t_d + t_o)/K \quad (6)$$

The minimum value, $t_{min}$, of this arrival time interval is obtained when an object has a closing velocity of $V_U$ and is at a distance $D_U$, since at lesser distances an object with the maximum closing velocity could not be observed for a time $t_o$ within the range of distances, as shown by Equations 2 and 3. Therefore:

$$t_{min} = D_U/V_U \quad (7)$$

and from Equation 2:

$$t_{min} = t_d + t_o \quad (8)$$

Since the signals must be observed for a time $t_o$, the maximum and minimum warning times, $W_{max}$ and $W_{min}$, are obtained by subtracting $t_o$ from Equations 6 and 8 to obtain, respectively:

$$W_{max} = [(t_d + t_o)/K] - t_o \quad (9)$$

and $$W_{min} = t_d \quad (10)$$

By choosing the limits of the ranges of closing velocities and distances in the above described manner, we ensure the fact that at least the desired minimum warning time will always be obtained for any object within these ranges, the maximum warning time being equal to a value greater than $t_d$, as shown by Equation 9, since the ratio between $V_L$ and $V_U$ is less than unity. However, as previously pointed out, too great a warning time is undesirable and K should be as close to unity as is compatible with the range of closing velocities for which the system must be designed.

Now the operation of the collision indication system of FIG. 1 will be reviewed. The antenna and doppler system illuminate a given sector of space and derive from objects bearing various modes of relative motion echo signals whose characteristics are indicative of the distances and closing velocities of the objects. Due to the directivity of the antenna, signal information depicting the presence of an object embraced by a range of directions is obtainable and these signals are already sorted as to the direction of their associated objects. The various sorters now proceed to process the echo signals, only allowing those signals to pass which are associated with objects lying within a distance range $D_U$ to $D_L$, which are moving with a substantially constant closing velocity falling within the range of closing velocities from $V_U$ to $V_L$, and with all sorting outputs being delayed for a time to check against false return signals. With K, $t_o$ and $t_d$ given, and with $V_L$, $D_U$, and $D_L$ calculated as noted above, every signal passing through the indicator will give an indication that an object will arrive at the system within a time interval from its reception of from $t_d+t_o$ to $V_U(t_d+t_o)/V_L$, thereby giving a minimum warning time of at least $t_d$.

It should be pointed out that FIG. 1 does not show the optimum system that could be devised, but it does illustrate the basic principles of the system to be utilized with the invention, namely, one using limited ranges of distances and closing velocities which minimize the effects of noise and make it possible to use an efficient predictor. The use of such limited ranges further eliminates needless alarms and establishes the order of priority of the threads. It should also be noted that the collision indicator could give a collision warning signal to the pilot of the craft bearing the system, or it could be used to turn the craft automatically in response to signals passing through the system.

In addition to determining whether or not an object is coming toward the system on a collision course, the operator of the craft might also want some sort of audio tone signals, as well as visual signals to be provided in order to warn of danger even when a pilot was not looking at the instrument panel. In FIGS. 2A and 2B is shown a preferred embodiment of the direction indication control of the invention which performs all of the foregoing functions with a minimum of electronic components and weight. Since all of the elements shown in these figures can be filled by structures well known in the art or clearly described herein, they are illustrated in block diagram form so as to avoid obscuring the invention.

Referring more specifically to FIG. 2A, there are shown the transmitting, receiving, and antenna portions of a pulsed, doppler radar system to be used with the preferred embodiment of the invention. Such elements are well known in the art and many other types of such devices could be used here; however, the particular transmitter shown is especially simple and light, and its use is considered desirable in the system. This transmitter generates pulses of radiant energy at an extremely stable frequency, and it includes a device 201 labeled Crystal Oscillator, for generating an extremely stable reference frequency. A crystal oscillator utilizing a 5670 tube for producing a 60 mc. signal output, with a crystal oven to minimize the effects of temperature change and insure temperature stability, would suffice here. One output from this oscillator is then fed into a Frequency Multiplier 202, such as a multi-stage exciter utilizing GL 6442 tubes. A suitable exciter would multiply the 60 mc. input thereto by 48 up to 2880 mc., and a portion of this 2880 mc. output signal would then be mixed in the exciter with the 60 mc. input signal to produce a frequency of 2940 mc. This last frequency is then amplified in a Power Amplifier 203 and supplied to a Duplexer 204 for isolating the receiving portion of the system from the transmitting portion.

The pulses driving the power amplifier 203 are generated in a Pulse Modulator 205 and preferably have a duration of 0.1 μsec., and this modulator is excited by a Pulse Repetition Rate Oscillator 206 which produces 20 kc. pulses. Oscillator 206 is in turn made to vary slightly in frequency by a Jitter Modulator 207, in order that confusion with other craft using the system shall be minimized. Thus, it will be apparent that the output of power amplifier 203 is a series of 0.1 μsec. pulses recurring at a rate in the vicinity of 20 kc. and having a carrier frequency of 2940 mc. These pulses then pass through the duplexer 204 and through an Adder 208 to a pair of Antennas 209 and 211, respectively labeled Front and Left. Each of the antennas 209 and 211 will cover approximately 90° in azimuth and 15° in elevation; however, the front antenna will cover only the forward 90°, while the left antenna will cover only the left 90°, relative to the craft bearing the collision indication system. The adder device 208 serves to distribute the energy from the transmitter equally between the two antennas; however it should be understood that if a single antenna were used to cover the entire 180°, no such adder device would have to be used. The pair of antennas 209 and 211, therefore, are connected together through the adder and cover what we shall call the front area.

In covering the rear area, a similar pair of antennas, 212 for the right, and 213 for the rear, are shown and these are interconnected through an Adder 214, which is in turn connected to a Rear Area Antenna Switch 215 for either blocking or passing energy to or from these antennas.

Signals reflected from objects moving relative to the system will pass through the antennas, adders, and the duplexer to a Signal Mixer 221. These reflected signals will be at a frequency of 2940 mc. plus or minus the doppler frequencies introduced by the closing velocities between the objects and the system. Into signal mixer 221 is also fed the 2880 mc. output from frequency multiplier 202 to be subtracted from the reflected signals, causing the output of this mixer to be 60 mc. plus or minus the doppler frequencies. This output is then amplified in an Intermediate Frequency Channel 222 and is then fed into a Doppler Mixer 223. Also fed into the doppler mixer is a 60 mc. signal derived from a Buffer Amplifier 224 into which, in turn, is fed a 60 mc. output from the crystal oscillator 201. The 60 mc. signal from the buffer amplifier will be subtracted from the intermediate frequency signal in the doppler mixer 223, and the difference will, therefore, be a bipolar, video pulse train, which contains the doppler frequency signal.

Referring now to the pulse modulator 205, it will be seen that it is also used to activate a Sweep Generator 225, for producing a linear sweep saw tooth voltage synchronous with the pulse repetition rate 20 kc., and the output of the sweep sawtooth generator is also fed into a Distance Reference Voltage Generator 226 for producing a series of D.-C. voltages labeled A—A. The voltages from generator 226 could also be derived from any suitable source of D.-C. voltage.

From the foregoing description of FIG. 2A it will be apparent that the elements there shown will cause a train of 20 kc., 0.1 μsec. pulses, with a carrier frequency of 2940 mc., to be sent out through the various antennas. Further, any such pulses reflected from a relatively moving object will be received through the various directive antennas, amplified, and mixed with the reference frequency to produce doppler frequency signals indicative of the closing velocities of the objects. Since a sawtooth sweep voltage is simultaneously produced in synchronism with each transmitted pulse, this sweep voltage will, therefore, serve to fix the time that a transmitted pulse was sent out by the system; and since the time between the sending out of a transmitted pulse and the reception of a reflected pulse from an object will be directly proportional to the distance of the object from which the pulse was reflected, it will be seen that the sweep voltage can be used in conjunction with the received, reflected signals to determine the distance of the object. Further, since the sweep voltage is linear, its instantaneous value will be directly proportional to distance; therefore, it is possible to use the sweep voltage to derive a series of D.-C. voltages, each of which will represent a given object distance from the system, and this is done in the distance reference voltage generator 226.

There are, then, three sets of outputs from the portion of the system shown in FIG. 2A, a bipolar video pulse train containing doppler frequencies which indicate the closing velocities of objects moving relative to the system, a sweep voltage having an amplitude directly proportional to the elapsed time between the transmitted pulses, and a series of distance reference voltages A—H, each of which has a different value and represents a given distance from the system. Therefore, all of the information needed to sort the reflected signals in accordance with the closing velocities of the objects from which they were reflected, and the distances of the objects from the collision indication system, is present in the output from the doppler radar system shown in FIG. 2A. All of this information is now transferred to the portion of the system shown in FIG. 2B, where it is sorted and a determination of whether or not a collision course exists is made.

Examining now channel A in FIG. 2B, it is designed, by way of example, to track objects at distances from the collision warning system of 25,600 to 20,800 ft., and at closing velocities of 1600 to 1300 ft./sec. Included in this channel is a Gating Circuit 301A for passing signals only within the range of distances for which this channel is designed, and it includes a Gate Generator 302A for generating a range gate approximately 0.2 μsec. long, which is the equivalent of almost a 100 ft. band of distances. By passing such a small band of distances, noise is minimized. A suitable gate generator could be an ordinary blocking oscillator with a pulse forming network in its anode circuit. One input into gate generator 302A is the distance reference voltage A derived from distance reference voltage generator 226 in FIG. 2A, and this voltage biases the blocking oscillator or gate generator and causes it to be normally inoperative. Another input to the gate generator 302A is the sweep voltage from sweep generator 225 in FIG. 2A, and only when the sweep voltage rises to value sufficient to overcome the bias of distance reference voltage A will the gate generator produce its 0.2 second gate, the bias of voltage A being such that the initial operation of the gate will correspond to 25,600 ft.

The output gate from gate generator 302A is applied across a Coincidence Circuit 303A, such as a bridge circuit, and also applied across this circuit is the signal input from the doppler mixer 223 of FIG. 2A. Coincidence circuit 303A will produce an output only when a signal from the doppler mixer is present and when a gate from its associated gate generator is also present. Upon the coincidence of these two inputs, an output is produced from the coincidence circuit and applied to a Velocity-Frequency filter 304A. This element is a doppler filter designed to pass only those doppler frequencies corresponding to 1600 to 1300 ft./sec. Since the doppler frequency is equal to twice the closing velocity of an object divided by the wave length of the carrier, and since the carrier of the transmitter shown in FIG. 2A has a frequency of 2940 mc., or approximately one third of a foot, it will be apparent that the doppler frequency is equal to six times the closing rate. Therefore, velocity-frequency filter 304A is so designed as to pass only signals having frequencies of between 9,600 and 7,800 c.p.s.

If the incoming signal from the dopper mixer occurs within the proper range of distances as governed by the gating circuit, and also falls within the proper range of velocities as determined by the velocity-frequency filter, signal information passes through that filter into a Frequency Discriminator and Limiter 305A, where it is converted into a D.-C. signal. One output of 305A is then applied back through an Integration and Limiter Circuit 306A into gate generator 302A. The output of this integration and limiter circuit is of opposite polarity from that of distance reference voltage A, and serves to change the position of the gate generated by gate generator 302A by lowering the bias thereon, with the result that the gate will now appear sooner and thereby serve to track oncoming objects.

A second output from the frequency discriminator is applied to an Acceleration Filter 307A which differentiates and smooths the output from the frequency discriminator and limiter 305A so as to determine its rate of change. Since rate of change of velocity is equal to acceleration, it will be clear that the output of filter 307A will be the closing acceleration of the object relative to the collision indication system.

Another output from the frequency discriminator and limiter circuit 305A is applied to an Observation Timing Circuit 308A for introducing a limited predetermined observation (averaging) period of at least $t_0$ into the circuit in order to minimize noise as much as possible. A suitable timing circuit would be a 3-second, one-shot multivibrator triggered by the output from circuit 305A.

Next is provided a Controlled Gating Magnetic Amplifier 309A having three input windings into which are respectively fed three signals, the output from observation timing circuit 308A, the output from acceleration filter 307A, and the output from frequency discriminator and limiter 305A. This controlled gating magnetic amplifier is so biased that it will enhance passage of a signal only when there is an input thereto from the frequency discriminator-limiter circuit 305A (indicating the presence of a reflected signal from a moving object within the range of distances and velocities), after the signal from delay circuit 308A has terminated, and only if the output from acceleration filter 307A is substantially zero (indicating that a relatively moving object is on a collision or a near-collision course). When all of these conditions have been satisfied, amplifier 309A produces output signal information to be applied to a Relay 310, which is connected to a Motor Timer 311.

In accordance with the portion of the present invention in FIG. 2B, there is shown an indicator panel 401 comprising a pair of indicator lamps 402 and 404 for illuminating suitable indicators 406 and 407 provided with legends of right and left, respectively. The right and left indicators 406 and 407, respectively, are illuminated by the lamps 402 and 404, respectively, in response to activation of the relay 310 and Motor Timer 311. In addition to the visual indicators 406 and 407, there are provided audio annunciators 403 and 405 associated with the lights 402 and 404, respectively. The indicator 406 provides collision avoidance signal information telling the pilot of the craft to turn to the right immediately upon the reception of a collision warning signal by the front or left antennas 209 or 211. Indicator 407 tells the pilot to turn to the left immediately upon the reception of a warning signal in the right or rear antennas 212 or 213. The right and left signal lamps 402 and 404, respectively, are energized in response to the position of the relay contacts of the relay 310 upon the activation of the Motor Timer 311. This direction indicating action is carried out by the present invention as further explained hereinafter.

It should be explained that, in accordance with the present invention, with relay 310 inactive, one of its contacts connects the lamps 404 of the turn left indicator 407 and its audio 405 to one terminal of a source of potential (not shown), but their connection to the other terminal of the source of potential can be made only by motor timer 311. When a signal is applied to relay 310, its one contact moves to connect the lamp 402 and its audio 403 of turn right indicator 406 to the one terminal of said potential source. Simultaneously, when a signal is applied to relay 310, it activates motor timer 311, which, in turn, completes the connection to the other terminal of the potential source for the lamps of both the turn right and left indicators, and their audios, and also opens antenna switch 215, as shown in FIG. 2A, to disconnect the rear area antennas. Thus, with a signal present, only the turn right indicator and audio will be activated, and they will remain so only if relay 310 remains activated. Therefore, if the signal information in the collision warning system comes from either the front or left antennas, it remains when the rear area antenna switch is opened by motor timer 311, and the turn right indicator and audio remain on. However, if the signal to relay 310 disappears when the rear area antenna switch is opened, relay 310 goes back to its original position, activating the turn left indicator and audio in this position. Motor timer 311 remains in its position where it activates the turn indicators and opens the rear area antenna switch, for a time interval such as 15 seconds, enough time to enable the pilot to be warned of danger and turn his craft and maintain it in the turn until the motor timer resets itself, thereby closing the rear area antenna switch and disconnecting the turn indicators from the other terminal of the potential source.

It will thus be apparent that by means of this relay, motor timer, and antenna switching arrangement, it is possible in accordance with the present invention to sense whether an incoming signal came from either the front or the rear areas, and the appropriate turn can be indicated. The "Rules of the Road" over airports are that if threats come from the front or left of a craft, the craft should turn to the right to avoid them; and if threats come from the right, the craft must turn to the left to avoid them. There is no rule as to threats from the rear, so it is proposed that the pilot turn to the left to avoid them. Thus, our indicator system is simplified, since only turn right and left indicators are needed to turn from threats coming from all four directions.

Variable distance channels B—G all operate in exactly the same way as channel A, except, of course, that they track objects at different ranges of distance and velocity, and each channel has its own correspondingly lettered distance reference voltage from generator 226 in FIG. 2A. Thus, the range of distances of channel B is from 20,800 to 16,900 ft. at a range of closing velocities from 1300 to 1000 ft./sec.; channel C has a range of distances from 16,000 to 13,000 ft. at 1000 to 700 ft./sec.; channel D tracks objects from 11,200 to 9100 ft. at 700 to 500 ft./sec.; channel E tracks objects from 8000 to 6500 ft. at 500 to 350 ft./sec.; channel F tracks objects from 5600 to 4550 ft. at 350 to 245 ft./sec.; and channel G tracks objects from 3920 to 3185 ft. at 245 to 165 ft./sec.

A Fixed Distance Channel H is also provided for warning of objects located from 2640 to 2145 feet and at relative velocities of 165 to 120 ft./sec. It will be noted that this channel possesses a Gating Circuit 301H, a Velocity-Frequency Filter 304H, a Frequency Discriminator-Limiter 305H, an Acceleration Filter 307H, an Observation Timing Circuit 308H, and a Controlled Gating Magnetic Amplifier 309H. All of these elements operate in ways similar to their correspondingly numbered elements in channel A; however channel H is designed to operate at different closing velocities and distances than channel A and has its own distance reference voltage H applied to its own gating circuit. The main difference between this channel and the variable distance channels A—G is that there is no feedback from the output of frequency discriminator-limiter 305H back to the gating circuit 301H. This means that the gate output from the gating circuit of this channel will remain at a fixed distance. In order to cover the desired range of distance, the gate produced by gating circuit 301H is a 1 $\mu$sec. gate, in contrast to the 0.2 $\mu$sec. gates of the variable distance channels. Such a 1 $\mu$sec. gate will cover an approximate distance range of 495 feet, and since no further distance range is desired, the gate need not be variable.

It will be seen from the foregoing that a collision indication system has been provided that will indicate the presence of all objects heading in a collision course toward a craft bearing the system including close objects at any closing velocity and objects having closing velocities lying within a band of closing velocities from 120 and 1600 ft./sec., and in a span of between 2145 and 25,600 ft. from the craft.

Also, in accordance with the present invention, the pilot of the craft will be told in which direction to turn to avoid the threat.

Moreover, utilizing three regulated, chopper-type, magnetic amplifier power supplies, transistors, and multi-purpose tubes whenever possible, the system of the invention as shown in FIGS. 2A and 2B, exclusive of the antennas, will weigh less than 78 pounds and can be contained in a volume of 0.84 cu. ft. Therefore, this collision warning system accomplishes all of the objects previously set forth.

A word should now be said as to how the various ranges of distance and velocity were obtained. It was first determined that an aircraft making a 10-second turn to the right away from objects approaching from the left or front, and to the left from objects approaching from the right or rear, at an acceleration of twice that of gravity (2$G$), would clear the oncoming objects by a minimum of 800 ft.; and if the turn were made at 0.6 $g$ for 10 seconds, the clearance would always be at least 100 ft. With regard to channel A, it was decided that the maximum closing velocity that might reasonably be encountered in normal conditions of aircraft flight, $V_U$, was 1600 ft./sec., corresponding to almost 1100 miles per hour. Then, since there was a 3-second observation time, $t_o$, in the equipment, since a 3-second pilot reaction time, $t_r$, was desired as a safety factor, and since a 10-second interval, $t_m$ was needed to turn the craft, the maximum distance, $D_U$, was determined from Equations 1 and 2 by multiplying 1600 ft./sec. by 16 seconds, to arrive at 25,600 ft. The lower distance, $D_L$, was determined from Equations 1 and 3 by multiplying seconds by the maximum velocity of 1600 ft./sec. to arrive at 20,800 ft. At that distance, a minimum warning time of 13 seconds was obtained at the maximum closing velocity. Now, bearing in mind that the smaller the range of closing velocities was, the better the signal-to-noise ratio would be, a lower closing velocity, $V_L$, was chosen at 1300 ft./sec., resulting in a doppler frequency range of 9600 c.p.s. to 7800 c.p.s. for this channel.

This lower closing velocity of 1300 ft./sec. now became the upper closing velocity, $V_U$, of channel B, and the entire process was repeated for this channel to arrive at the values noted above. The process was again repeated for channels C to H. However, in no instance was the K of equation 4 less than 0.7 when the lower closing velocities were determined. Thus the entire band of closing velocities from 120 ft./sec to 1600 ft./sec. was continuously covered, insuring that no object within that band would be overlooked by the collision warning system. Further, each channel only passed signals from objects on collision courses that would arrive at the collision warning system within minimum time of 16 seconds to a maximum time of 25.8 seconds after their signals arrived at the system, thereby ensuring that noise was minimized and that the warning times were the desired minimum of 13 seconds.

Although the system shown in FIGS. 2A and 2B distinguishes between objects having closing velocities directed toward the system from those directed away from the system by having tracking gates which only can follow oncoming objects, other ways of distinguishing such objects are possible. For example, the acceleration sorting circuits shown in FIGS. 1 and 2B could be so biased as to pass only signals corresponding to oncoming objects. Thus in a modified system in which the distance gates were fixed in position, such a biased acceleration sorter would be useful. Further, since the number of oncoming objects is so much greater than the number of receding objects, a fixed gate system that failed to distinguish between such objects would also be a useful one.

The presently disclosed system may also be modified in numerous other ways so long as the principles previously outlined are followed. For example, the number of channels used could be varied, either the ranges of closing velocities or the ranges of distances could be overlapping or continuous, the observation or averaging time, $t_o$, of each channel could be different, the various gates could have differing durations, etc.

Many such changes in the elements and parameters of the various channels could be made, provided only that every object on a collision course within the desired band of closing velocities is indicated in sufficient time to avoid it, and that noise is sufficiently minimized so that a usable signal can be obtained.

It should be understood that many types of antennas could be used other than those described herein. Also, any number of antennas could be used.

It should be understood that the present invention is not limited to aircraft, since land vehicles will also find it useful, and that the disclosed system could use the collision indication signal to turn the craft automatically, where this service was desired.

It should also be understood that the observation timing circuits shown in FIGS. 1, 2A and 2B could be replaced by switching devices, well known in the art, which would only permit the antennas to transmit energy for limited time intervals, provided that these intervals gave sufficient averaging time to obtain a usable signal. Similarly, many of the other elements described in the foregoing could be replaced, but these and the many other variations that may occur to those skilled in the art will not alter the basic principles of the invention; and it is these principles which have made it possible to meet, practically speaking, all of the requirements previously noted and provide, for the first time, a practical, useful collision indication system.

While there has been described what is at present considered a preferred embodiment of the invention, it will be obvious to those skilled in the art that various changes and modifications may be made therein without departing from the invention, and it is aimed in the appended claims to cover all such changes and modifications as fall within the true spirit and scope of the invention.

The embodiments of the invention in which an exclusive property or privilege is claimed are defined as follows:

1. In a collision warning system of the type adapted to pass a signal derived from an object moving relative to the system, a direction determining arrangement comprising: a plurality of sensing devices each receptive of signals from different directions; receiver means connected to said sensing devices for determining a collision threat; first means connected to said receiver to respond only to a signal indicating a collision threat of an object; second means connected to said first means for desensitizing at least one of said sensing devices; and indicator means connected to said first means for displaying a warning indicative of the direction of approach of said collision threat object in response to said sensing device desensitization by said second means.

2. In a collision avoidance system for a craft vulnerable to collision with objects conditionally lying in a plurality of different directions relative to said craft and bearing relative motion with respect to said craft the combination of: first means responsive to objects lying within a first given range of directions to develop signal information at least representing the relative motion of objects embraced by said first range of directions; second means responsive to objects lying within a second different range of directions to develop signal information at least representing the relative motion of objects embraced by said second range of directions; signal analyzing means simultaneously responsive to signal information developed by both said first and second signal developing means for providing a collision threat signal output only in response to signal information representative of objects whose relative motion with respect to said craft constitutes a collision threat; indication means connected to respond to said signal analyzing means to provide a collision threat indication; direction determining means connected to respond to an output of said signal analyzing means for interrupting only one of said first and second means; and means for controlling said indication means to display the direction of threat in response to signal interruption by said direction determining means.

3. In a collision warning system of the type adapted to pass a signal derived from an object moving relative to the system, a direction-determining arrangement comprising: a plurality of sensing devices each receptive of signals from distinctly different directions; receiver means connected to said sensing devices for determining a collision threat; first means connected to said receiver means to respond only to a signal received by said sensing devices indicating a collision threat; indicator means connected to said first means for providing a warning of said collision threat; second means controlled by said first means to provide at least momentary desensitization of a part of said plurality of sensing devices and for maintaining said part of said plurality of sensing devices desensitized for a selected period of time; and means comprising a portion of said indicator means for providing an indication of the direction of approach of said collision threat.

4. In a collision avoidance system for a craft vulnerable to collision with objects conditionally lying in a plurality of different directions relative to said craft and bearing relative motion with respect to said craft, the combination of: first means responsive to objects lying within a first given range of directions to develop signal information at least representing the relative motion of objects embraced by said first range of directions; second means responsive to objects lying within a second different range of directions to develop signal information at least representing the relative motion of objects embraced by said second range of directions; signal analyzing means simultaneously responsive to signal information developed by both said first and second signal providing means for developing a collision threat signal output only in response to signal information representative of objects whose relative motion with respect to said craft constitutes a collision threat; third means responsive to the development of said threat signal output for at least momentarily disabling said first signal developing means; and means responsive to the amplitude of said threat signal output, upon disablement of said first signal developing means by said third means, for producing collision avoidance signal information indicating in which of said ranges of directions a threatening object lies.

5. In a collision warning system of the type adapted to pass a signal derived from an object moving relative to the system, a direction-determining arrangement comprising: a plurality of sensing devices each receptive of signals from distinct directions; receiver means connected to said sensing devices for processing said signals and for determining a collision threat; and means operable in response to a receiver-processed signal indicating a collision threat for interrupting a part of said signal sensing devices.

6. In a collision warning system of the type adapted to pass a signal derived from an object moving relative to the system, a direction determining arrangement comprising: a pair of sensing means each receptive of signals from distinctly different directions; receiver means connected to said sensing devices for determining a collision threat; control means connected to said receiver means to respond to a signal indicating a collision threat; means forming a portion of said control means for desensitizing a one of said pair of sensing means; and display means responsive to said control means for providing a warning indicative of the direction of approach of said object in response to said desensitization.

7. In a collision avoidance system for a craft vulnerable to collision with objects conditionally lying in a plurality of different directions relative to said craft and bearing relative motion with respect to said craft, the combination of: first means responsive to objects lying within a first given range of directions to develop signal information at least representing the relative motion of objects embraced by said first range of directions; second means responsive to objects lying within a second different range of directions to develop signal information at least representing the relative motion of objects embraced by said second range of directions; signal analyzing means simultaneously responsive to signal information developed by both said first and second signal developing means for providing a collision threat signal output only in response to signal information representative of objects whose relative motion with respect to said craft constitutes a collision threat; means responsive to the development of said threat signal for at least momentarily disabling said first signal developing means; indicator means having first and second direction indications; and means for controlling said indicator means to display said first direction indicator upon uninterruption of said collision threat signal output and to display said second direction indication upon interruption of said collision threat signal output.

8. In a collision avoidance system for use in protecting a craft vulnerable to collision with objects conditionally lying in a plurality of different directions relative to the craft, the combination of: means for detecting the presence of an object lying within predetermined ranges of distance and direction relative to said craft and developing output signal information at least representative of the distance and motion of objects relative to said craft; signal analyzing means responsive to said output signal information for developing threat representing signal information only when the distance and motion of a given object is such to constitute a substantial threat of collision between a given detected object and said craft; means for determining the relative direction of an object threatening collision with said craft; means responsive to said signal analyzing means for deactivating a portion of said detecting means and activating said direction determining means only upon the development of said threat representing signal information; and means responsive to said signal analyzing means and direction determining means for developing collision avoidance signal information only after said direction determining means has operated to determine the relative direction of an object threatening collision with said craft.

9. In a direction indicating system suitable for use in collision avoidance apparatus for protecting a craft vulnerable to collision with objects conditionally lying in a plurality of different directions relative to said craft, the combination of: first means responsive to objects lying within a first given range of directions to develop signal information at least depicting the presence of an object embraced by said first range of directions; second means responsive to objects lying within a second different range of directions to develop signal information at least depicting the presence of an object embraced by said second range of directions; means simultaneously responsive to both said first and second signal developing means for developing an indicating signal representing the presence of an object in said ranges of directions; third means responsive to the development of said indicating signal for momentarily disabling said first signal developing means; and means responsive to the amplitude of said indicating signal, upon disablement of said first signal developing means by said third means, for producing direction indicating signal information depicting in which of said ranges of directions a given object lies.

10. A direction determining apparatus useful in a collision warning system comprising: a plurality of sensing devices each receptive of signals from different directions; receiver means connected to said sensing devices for developing an output signal in response to received signals representing existence of an object; means coupled to said receiver means and responsive to said output signal for desensitizing at least one of said sensing devices; and enunciator means coupled to said receiver means for producing an indication of the direction of said object from said system upon said desensitization of said at least one of said sensing devices.

11. In a collision warning system: a plurality of sensing devices each receptive of signals from different directions and representing moving objects; receiver means connected to said sensing devices for developing an output signal in response to received signals representing a threat of a collision between the system and an object; means coupled to said receiver means and responsive to said output signal for desensitizing at least one of said sensing devices; and enunciator means coupled to said receiver means for producing a warning indicative of the direction of approach of said collision threat object upon said desensitization of said at least one of said sensing devices.

References Cited in the file of this patent

UNITED STATES PATENTS 2,486,197    Newbold _____ Oct. 25, 1949